US012748952B2

(12) United States Patent
Janjos et al.

(10) Patent No.: US 12,748,952 B2
(45) Date of Patent: Sep. 29, 2026

(54) METHOD FOR DETERMINING AGENT TRAJECTORIES IN A MULTI-AGENT SCENARIO

(71) Applicant: Robert Bosch GmbH, Stuttgart (DE)

(72) Inventors: Faris Janjos, Stuttgart (DE); Maxim Dolgov, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 766 days.

(21) Appl. No.: 18/058,416

(22) Filed: Nov. 23, 2022

(65) Prior Publication Data

US 2023/0169313 A1 Jun. 1, 2023

(30) Foreign Application Priority Data

Nov. 26, 2021 (DE) ..................... 10 2021 213 344.4

(51) Int. Cl.
*G06N 3/0455* (2023.01)

(52) U.S. Cl.
CPC .................................. *G06N 3/0455* (2023.01)

(58) Field of Classification Search
CPC .................................................... G06N 3/0455
See application file for complete search history.

(56) References Cited

PUBLICATIONS

Li, "Spatio-Temporal Graph Dual-Attention Network for Multi-Agent Prediction and Tracking" (Year: 2021).*
Yuan, "AgentFormer: Agent-Aware Transformers for Socio-Temporal Multi-Agent Forecasting" (Year: 2021).*
Vaswani et al., "Attention Is All You Need", Advances in Neural Information Processing Systems, 2017 (11 pages).

* cited by examiner

*Primary Examiner* — Van C Mang
(74) *Attorney, Agent, or Firm* — Maginot, Moore & Beck LLP

(57) ABSTRACT

A method for determining agent trajectories in a multi-agent scenario includes capturing, for each agent, previous trajectories of the agents and a vicinity of the agent in a local reference frame of the agent; and coding, for each agent, the previous trajectories of the agents, captured in the local reference frame of the agent, into trajectory feature vectors and the vicinity of the agent, captured in the local reference frame of the agent, into vicinity feature vectors using an encoder neural network. The method further includes processing, for each agent, the trajectory feature vectors, depending on one another and depending on the vicinity feature vectors, into local-context feature vectors using an attention-based neural network; and processing the local-context feature vectors for all agents into a global-context feature vector for each agent using a common attention-based neural transformation network.

8 Claims, 5 Drawing Sheets

METHOD FOR DETERMINING AGENT TRAJECTORIES IN A MULTI-AGENT SCENARIO

This application claims priority under 35 U.S.C. § 119 to patent application no. DE 10 2021 213 344.4, filed on Nov. 26, 2021 in Germany, the disclosure of which is incorporated herein by reference in its entirety.

BACKGROUND

The present disclosure relates to methods for determining agent trajectories in a multi-agent scenario.

In the area of autonomous systems, predicting the behavior of moving objects in the vicinity of a controlled agent (such as a vehicle) is an important task in order to reliably control the agent and to avoid collisions, for example.

For example, an autonomous vehicle must be capable of anticipating the future development of a travel situation, which in particular includes the behavior of other vehicles in the vicinity of the autonomous vehicle, in order to enable performant and safe automated driving. Determining a control of the autonomous vehicle, e.g., represented by a future trajectory to be followed by the autonomous vehicle, therefore must include the behavior of other autonomous vehicles.

Accordingly, reliable approaches to predict agent behavior, i.e., to determine (expected) trajectories in a multi-agent scenario, are desirable.

The publication "Attention Is All You Need" by A. Vaswani et al., in Advances in Neural Information Processing Systems, 2017, pages 5998-6008, hereinafter referred to as Reference 1, describes transformation networks, in particular a multi-head-attention transformation network that can be used in an encoder-decoder architecture.

SUMMARY

According to various embodiments, a method for determining agent trajectories in a multi-agent scenario is provided, the method comprising capturing, for each agent, previous trajectories of the agents and a vicinity of the agent in a local reference frame of the agent; coding, for each agent, the previous trajectories of the agents, captured in the local reference frame of the agent, into trajectory feature vectors and the vicinity of the agent, captured in the local reference frame of the agent, into vicinity feature vectors by means of an encoder neural network; processing, for each agent, the trajectory feature vectors, depending on one another and depending on the vicinity feature vectors, into local-context feature vectors by means of an attention-based neural network; processing the local-context feature vectors for all agents into a global-context feature vector for each agent by means of a common attention-based neural transformation network; determining, for each agent, control actions from the global-context feature vector for the agent by means of an action-prediction neural network; and determining, for each agent, a future trajectory from the determined control actions by means of a kinematic model.

The method described above allows for effective prediction of trajectories in a multi-agent scenario. In such a prediction, e.g., in a common, compatible prediction of a travel situation (i.e., when agent a performs a particular maneuver, agent b may perform only that maneuver, and vice versa) by means of neural networks (e.g., graph neural networks), the question is how the coordinate system is to be defined for the prediction. The reason for this is that the use of a global map-referenced coordinate system makes it difficult for the deep-learning (DL) architecture to learn locality of prediction, thereby limiting generalizability, e.g., similar behavior in various intersections. Alternatively, there are methods that absolutely require a reference agent.

For this purpose, the method described above provides an effective approach by first considering the context of the agents locally, i.e., representing and processing it in local reference frames, and then combining the results of these processings into a common transformation network. When training the (overall) model for a common, compatible prediction, the travel situation model learns an implicit global coordinate system and can thus generalize between travel situations without the need for a reference vehicle. In addition, as a result of the different local representations, an asymmetric knowledge distribution among the agents can be represented; e.g., the model can learn that agent a cannot react to agent b because agent a cannot perceive agent b, whereas agent b can recognize and react to agent a.

The output of the common transformation network is then used by an action-prediction neural network and a kinematic model to determine trajectories. The kinematic model is a physical model for the movement of agents (e.g., the bicycle model). It saves the DL architecture from learning dynamics, reducing the need for training data, and ensures the generation of dynamically meaningful predictions.

Various exemplary embodiments are specified below.

Exemplary embodiment 1 is a method for determining agent trajectories in a multi-agent scenario, as described above.

Exemplary embodiment 2 is a method according to exemplary embodiment 1, comprising capturing, for each agent, the vicinity as a set of vicinity elements, wherein each vicinity element is encoded into vicinity feature vectors, and forming, for each vicinity element, a star graph comprising, as the central node, a node with the trajectory feature vector of the agent, wherein the central node is surrounded by nodes with the vicinity feature vectors of the vicinity element, wherein the attention-based neural network comprises one or more graph-attention networks, to which the star graphs are supplied.

With the star architecture with information about the agent for which prediction is being performed, in the center and information about the vicinity elements (e.g., map elements, such as lane markings, crosswalks, curbs, and other agents (i.e., their feature vectors)) in the surrounding nodes, the DL architecture can learn, by means of the attention mechanism, which infrastructure elements are relevant to the prediction.

Exemplary embodiment 3 is a method according to exemplary embodiment 2, wherein the one or more graph-attention networks generate vicinity-element feature vectors and the attention-based neural network comprises an attention-based neural transformation network that processes trajectory feature vectors, depending on one another and depending on the vicinity-element feature vectors, into the local-context feature vectors.

The attention-based neural transformation network of the attention-based neural network allows training to learn which other agents are relevant to the prediction for the respective agent.

Exemplary embodiment 4 is a method according to one of exemplary embodiments 1 to 3, wherein the common attention-based neural transformation network is a multi-head-attention transformation network.

Such a transformation network enables a prediction model of relatively low complexity.

Exemplary embodiment 5 is a method according to one of exemplary embodiments 1 to 4, comprising acquiring training data comprising training data elements, wherein each training data element comprises information about the vicinity, previous trajectories of the agents, and target trajectories for a respective training scenario; and training the encoder network, the attention-based neural network, the common attention-based neural transformation network, and the action-prediction neural network by means of supervised learning using the training data.

Exemplary embodiment 6 is a controller configured to perform a method according to one of exemplary embodiments 1 to 5.

Exemplary embodiment 7 is a computer program comprising instructions that, when executed by a processor, cause the processor to perform a method according to one of exemplary embodiments 1 to 5.

Exemplary embodiment 8 is a computer-readable medium storing instructions that, when executed by a processor, cause the processor to perform a method according to one of exemplary embodiments 1 to 5.

BRIEF DESCRIPTION OF THE DRAWINGS

In the drawings, similar reference signs generally refer to the same parts throughout the various views. The drawings are not necessarily to scale, wherein emphasis is instead generally placed on the representation of the principles of the disclosure. In the following description, various aspects are described with reference to the following drawings.

DETAILED DESCRIPTION

The following detailed description relates to the accompanying drawings, which show, for clarification, special details and aspects of this disclosure in which the disclosure may be implemented. Other aspects may be used and structural, logical, and electrical changes may be made without departing from the scope of protection of the disclosure. The various aspects of this disclosure are not necessarily mutually exclusive since some aspects of this disclosure may be combined with one or more other aspects of this disclosure in order to form new aspects.

Various examples are described in more detail below.

Figure 1:
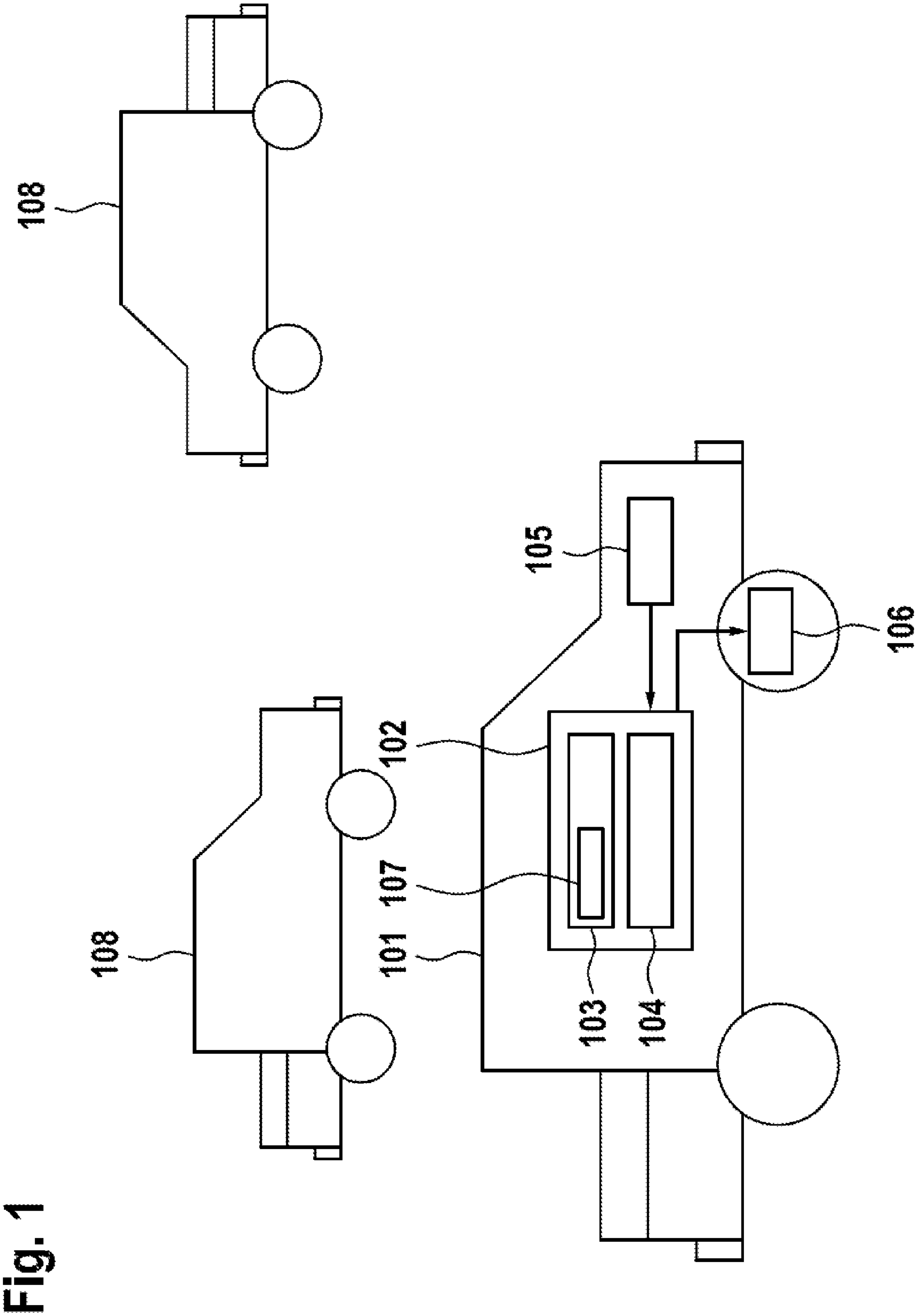
FIG. 1 shows a vehicle.

FIG. 1 shows a vehicle 101.

In the example of FIG. 1, a vehicle 101, e.g., a car or truck, is provided with a vehicle controller 102.

The vehicle controller 102 comprises data processing components, e.g., a processor (e.g., a CPU (central processing unit)) 103 and a memory 104 for storing control software according to which the vehicle controller 102 operates, and data processed by the processor 103.

For example, the stored control software (computer program) comprises instructions that, when executed by the processor, cause the processor 103 to implement a machine learning (ML) model 107.

The data stored in the memory 104 may, for example, include image data captured by one or more cameras 105. The one or more cameras 105 may, for example, take one or more grayscale or color photos of the vicinity of the vehicle 101. Using the image data (or also data from other sources of information, such as other types of sensors or also vehicle-to-vehicle communications), the vehicle controller 102 can detect objects in the vicinity of the vehicle 101, in particular other vehicles 108, and can determine their previous trajectories.

The vehicle controller 102 can examine the sensor data and control the vehicle 101 according to the results, i.e., determine control actions for the vehicle and signal them to respective actuators of the vehicle. For example, the vehicle controller 102 can control an actuator 106 (e.g., a brake) in order to control the speed of the vehicle, e.g., to brake the vehicle.

The controller 102 must include the behavior of the further vehicles 108, i.e., their future trajectories, in determining a future trajectory 101 for the vehicle 101. The controller 106 must thus predict the (future) trajectories of the other vehicles 108.

According to various embodiments, a deep learning (DL)-based method for predicting future trajectories for agents in a travel situation is described, which is based on a graph representation of the travel situation and uses a graph neural network (GNN) architecture to process it.

Figure 2:
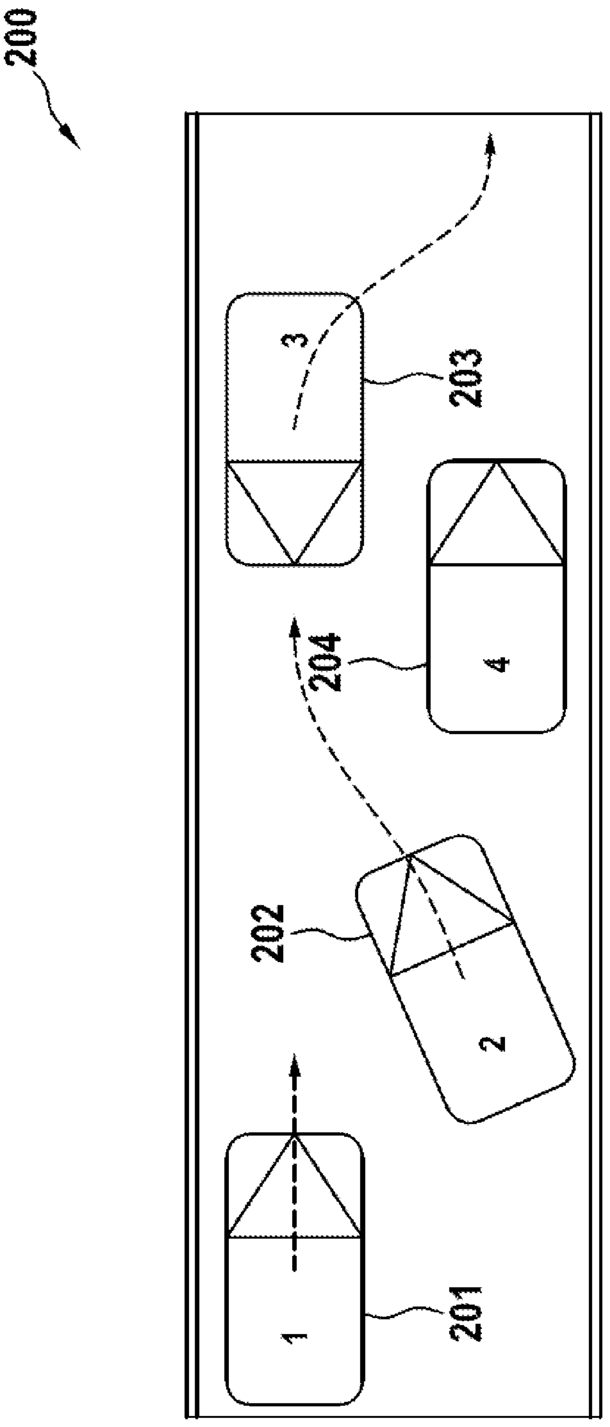
FIG. 2 shows an example of a travel situation.

FIG. 2 shows an example of a travel situation.

The example of FIG. 2 shows a highly interactive situation with four vehicles 201, 202, 203, and 204: The first vehicle 201 must drive slower to permit the second vehicle 202 to drive past the parking fourth vehicle 204. The third vehicle 203 must return to its lane after the fourth vehicle 204.

In the following, a trajectory prediction for N interacting agents is considered in general. The task of prediction for a single agent, e.g., the i-th of N vehicles, is to predict the distribution of future waypoints $\hat{Y}_i$ of the i-th vehicle. This may be formulated in an imitation learning framework, wherein a trained ML model parameterizes the distribution $$\hat{Y}_i \sim P(\hat{Y}_i | \mathcal{D}^i) \tag{1}$$

wherein the condition in the conditional probability is the local context $\mathcal{D}^i$ of the i-th vehicle (the state of the vicinity of the vehicle, of the vehicle itself, etc.). The superscript (upper) index (here, i) indicates that the respective variables are represented in the local reference frame of the i-th vehicle. The subscript (lower) index (here, likewise, i) indicates that the prediction is for the i-th agent. The ^character denotes predicted future values. A bold $\hat{\mathbf{Y}}_i$ indicates the random variable of the predicted waypoints.

According to various embodiments, instead of a distribution, a sample $\hat{Y}_i$ of the distribution from (1) is predicted, e.g., a 2×T matrix of xy coordinates over T future time steps.

Figure 3:
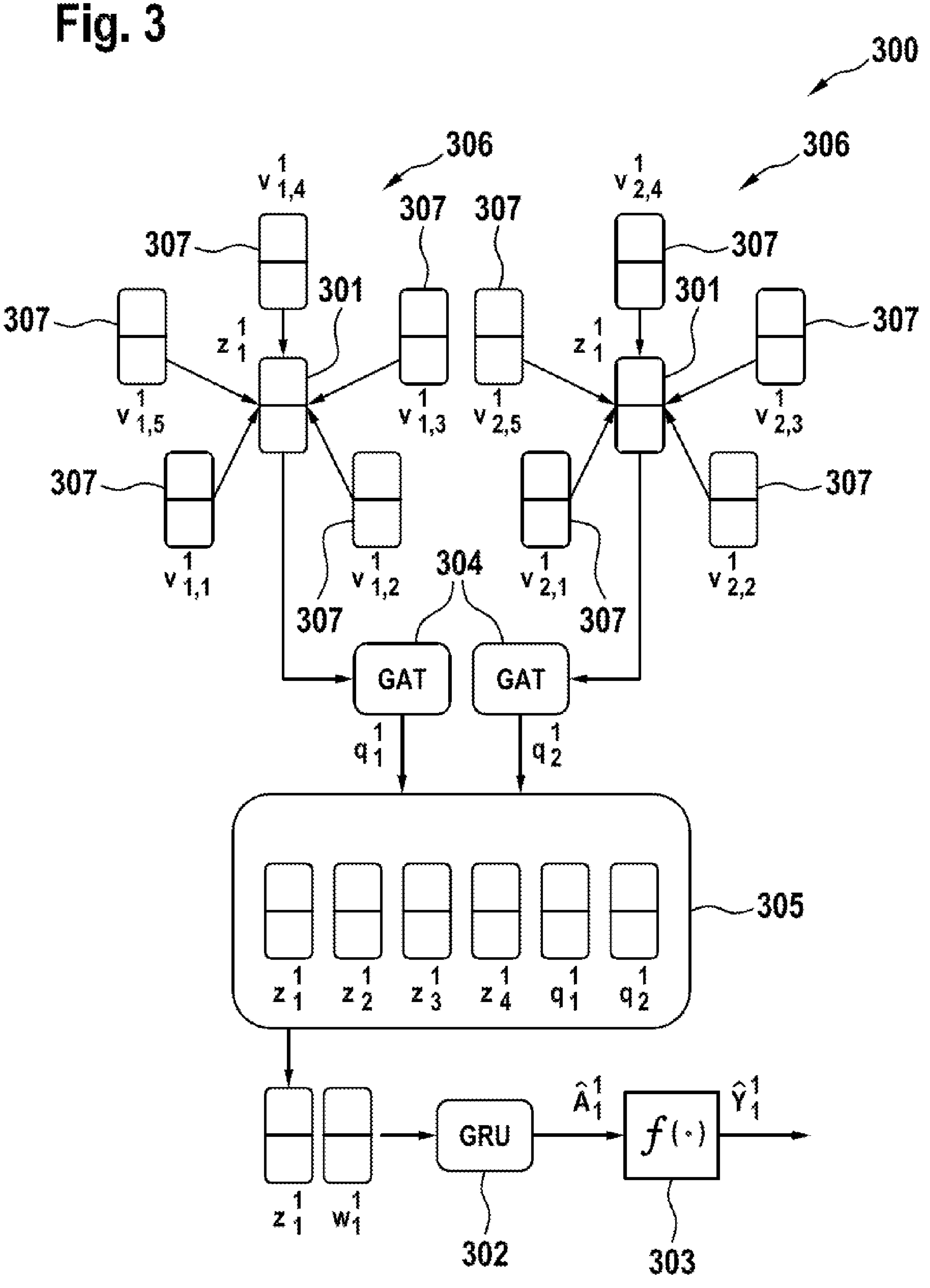
FIG. 3 shows a model for predicting a trajectory for an agent.

FIG. 3 shows an ML model 300 for predicting a trajectory for an agent.

The predicted trajectory here is the trajectory for the first agent in the reference frame of the first agent, i.e., $\hat{Y}_1^1$.

The context may be divided into $\mathcal{D}^i = \{\mathcal{M}^i, \mathcal{T}^i\}$, wherein $\mathcal{M}^i$ is the map and $\mathcal{T}^i$ are the previous trajectories of the i-th vehicle and of the other N−1 agents, wherein $$\mathcal{T}^i = \{X_j^i\}_{j=1}^N.$$

Each trajectory $$X_j^i$$

is a 3×T matrix of xy coordinates of the agent j over T elapsed time steps (which may be a different T than the number of future time steps T) in the reference frame of the i-th vehicle in the current time step for which a prediction is to be made, and a padding row since the respective agent may not be present in the scene for each time step. The padding row contains zeros for time steps at which the agent is absent and contains ones otherwise.

When co-predicted, trajectories of K (K≤N) vehicles are predicted simultaneously. The ML model trained for this purpose thus parameterizes the distribution, wherein $$\hat{Y} \sim P(\hat{Y}|\mathcal{D}) \quad (2)$$

Therefore, by means of the ML model, a sample Ŷ of Ŷ for future trajectories for all K vehicles can be predicted if the context $\mathcal{D}$ is given, wherein $$\hat{Y} = \{\hat{Y}_k\}_{k=1}^K \text{ and } \mathcal{D} = \{\mathcal{D}^k\}_{k=1}^K.$$

Each $\mathcal{D}^k$ may be broken down into its map component $\mathcal{M}^k$ and its route component $$\mathcal{T}^k = \{X_j^k\}_{j=1}^N.$$

It should be noted that the routes $\mathcal{T}^k$ contain trajectories for all N agents, including those whose trajectories are not predicted, such as pedestrians and bicycles.

According to various embodiments, an encoder-decoder structure comprising a context encoder and an output (or action) decoder is used to parameterize the distributions in (1) and (2). The encoder encodes the context $\mathcal{D}$, whereas the decoder generates the predicted trajectories Ŷ. In addition, route encoders are used; for example, each route $$X_j^i (i \in [1, \ldots, K], j \in [1, \ldots, N])$$

is encoded into a feature vector $$z_j^i$$

(in the example of FIG. 3, feature vectors $$z_1^1$$

in graph nodes 301) by means of a 1D convolution network (not shown in FIG. 3).

According to various embodiments, positional representations are used in modeling the vicinity $\mathcal{D}$ with the context encoder. Both the map $\mathcal{M}$ (represented by polygonal lines) and the routes contain xy coordinates, which describe points of polygonal lines or past trajectories. When generating learned feature representations of the vicinity, map-dependent interactions are therefore derived from data in Euclidean space.

However, when generating the predicted trajectories Ŷ by means of the decoder, the learning problem is shifted to the action space, with actions being given, for example, by accelerations and steering angles. Past actions are provided in the form of action sequences $$A_i^i$$

(i∈[1, . . . , K]) and future actions are generated by means of a gate recurrent unit 302 (GRU). This corresponds to an action-space-prediction framework and ensures that the trained ML model does not need to represent motion models and that the trajectories generated (using a kinematic output model 303) are kinematically possible. Similar to the routes, the past action sequences are encoded with the same network into feature vectors $$w_i^i,$$

e.g., a network having the same architecture as the 1D convolution network (but weights trained independently thereof).

In the example of FIG. 2, the GRU 302 and the kinematic output model 303 form the decoder. The decoder forms a multi-modal action predictor that directly provides one or more samples of the distribution (1). The encoder is formed by the route encoder (not shown), GATs (graph-attention networks) 304 processing star graphs 306, and a transformation network 305, which together form a map-dependent interaction model.

In order to form the star graphs 306, each map element, such as a sidewalk, a roadway median strip, or a traffic island, is formed by a polygonal line consisting of fixed-length vectors. Thus, the representation $\mathcal{M}^i$ of the map in the reference frame of the i-th agent consists of Q polygonal lines $$\mathcal{M}^i = \{q_j^i\}_{j=1}^Q$$

Each polygonal line in turn consists of L vectors, each given by their start and end xy coordinates, and a one-hot type coding.

$$q_j^i = \{v_{jl}^i\}_{l=1}^L, \quad (4)$$

$$v_{jl}^i = [v_{start}, v_{end}, v_{type}]^T. \quad (5)$$

The type is, for example, "road boundary" or "median strip."

With this polygonal-line representation, a directed star graph 306 is constructed for each polygonal line $$q_j^i.$$

In each star graph 306, the previous ego route (i.e., the route of the i-th vehicle considered, where i=1 in the example of FIG. 2) corresponds to the central node 301, i.e., the central node 301 has the feature vector $$z_i^i$$

(i.e., $$z_1^1$$

in the example of FIG. 3) as the feature vector.

The star graph for the polygonal line $$q_j^i$$

contains a node 307 for each vector $$v_{jl}^i$$

of the polygonal line and a respective edge connecting the node to the central node 306. In order to ensure compatibility in transmitting messages between the nodes in the graphs 306 (e.g., when processed by a GAT), the dimension of the features of the nodes 307 is the same as that of the central nodes 301.

Each star graph 306 is supplied to a respective GAT 304. Each GAT 304 has, for example, two layers and aggregates the features of the nodes of the respectively supplied graph by means of max pooling in order to generate embeddings, likewise denoted by $$q_j^i,$$

(visible at the polygonal-line level) with the same dimensionality as the features of nodes 301, 307.

The star graphs 306 with the associated GATs 304 model the relationship between the ego route and the map. It is assumed that more information is contained in the direct attention of a vehicle (represented by the embedding of the ego route $$z_i^i$$

) for a specific vector of a polygonal line than between the polygonal-line vectors themselves. This allows the extension of the receptive field since the attention mechanism learns in the training of the model to ignore vectors (i.e., map elements) far away from the ego route and to consider them proportionally to their weights in the aggregation. An arrangement of the vectors from (5) is not required.

In the ML model for a single agent, as shown in FIG. 3, the map-dependent interaction between the (ego) agent and the other agents (here, N=4 as in the exemplary scenario of FIG. 2), which are involved in the scenario, is modeled by means of the transformation network 305. It combines the embedding of the ego route $$z_i^i$$

(i.e., $$z_1^1$$

in the example of FIG. 3) with both the polygonal-line embeddings $$q_j^i (j \in [1, \ldots, Q])$$

and embeddings $$z_j^i (j \in [1, \ldots, N-1])$$

(generated by means of the route encoder) for the routes of the other agents (from the point of view, i.e., in the reference frame, of the ego agent, i.e., the i-th agent). To this end, the embeddings are arranged in a matrix with N+Q rows and supplied as input to the transformation network 305 (e.g., consisting of a single transformation layer). The transformation network 305 generates linear projections of its input in the form of a query matrix Q, a key matrix K, and a value matrix V. It then applies a self-attention mechanism to derive the relationships between the embeddings, for example according to $$\text{Attention }(Q, K, V) = \text{softmax}\left(\frac{QK^T}{\sqrt{d_k}}\right)V,$$

wherein $d_k$ is the dimension of the queries and keys.

According to various embodiments, the transformation network 305 is a multi-head-attention transformation network.

In this case, a multi-head attention is calculated, for example according to $$MultiHead(Q, K, V) = \text{Concat}(\text{head}_1, \ldots, \text{head}_h)W^O$$

wherein $$\text{head}_i = \text{Attention}\left(QW_i^Q, KW_i^K, VM_i^V\right).$$

In so doing, parameter matrices $$W_i^Q, W_i^K, W_i^V, W^O$$

cause projections (the index i here does not correspond to the index for the vehicle as above but to the respective attention head). For example, the number of attention heads h is equal to eight. Details are described, for example, in Reference 1.

The output of the transformation network 305 has the same dimension as the input matrix. In order to determine a trajectory for the i-th vehicle, the row corresponding to this vehicle is selected. It contains an updated route embedding $$z_i^i(\text{i.e., } z_1^1$$

in the example of FIG. 3). As a result of the GATs 304 and the transformation network 305, the obtained embedding $$z_i^i$$

captures map-dependent interaction between the agents in the local context of the ego vehicle.

It is concatenated together with the action-sequence embedding $$w_i^i(\text{i.e., } w_1^1$$

in the example of FIG. 3) and supplied to the (action) decoder in order to determine the predicted trajectory. That is to say, $$z_i^i$$

is supplied, together with $$w_i^i,$$

to the GRU 302, which predicts future actions $$\hat{A}_1^1$$

therefrom, and the kinematic model 303 provides the predicted trajectory $$\hat{Y}_1^1$$

therefrom. The GRU 302 contains, for example, two layers of 512 hidden nodes.

The decoder thus combines the positional embedding of the ego vehicle, aggregated in order to account for the map-dependent interaction with other agents, with the action embedding. The GRU 302 generates steering angles and accelerations as actions and, for example, directly predicts m action modes (trajectories and associated probabilities). The kinematic model 303 converts actions into future positions.

The entire pipeline is trained with the loss $$\mathcal{L} = \mathcal{L}_{reg} + \beta\mathcal{L}_{class}. \tag{6}$$

The training data contain training data elements that each contain input data (i.e., context data of the agents) and associated ground-truth trajectories (i.e., target trajectories). The loss term $\mathcal{L}_{reg}$ penalizes the difference between the determined (i.e., predicted) trajectories and the ground-truth trajectories. The loss term $\mathcal{L}_{class}$ considers the action-mode probability via cross entropy, wherein β is set to one, for example.

The parameters of the ML model (weights of the various networks) are then adjusted in the usual manner toward decreasing loss (i.e., by means of back-propagation).

According to various embodiments, building on the ML model of FIG. 2 for an agent, an ML model is used (e.g., by the controller 106 as ML model 117) that directly models the common distribution (2) without factoring into individual agents. This achieves a common prediction by aggregating local features into an implicit global reference frame over masked self-attention.

Figure 4:
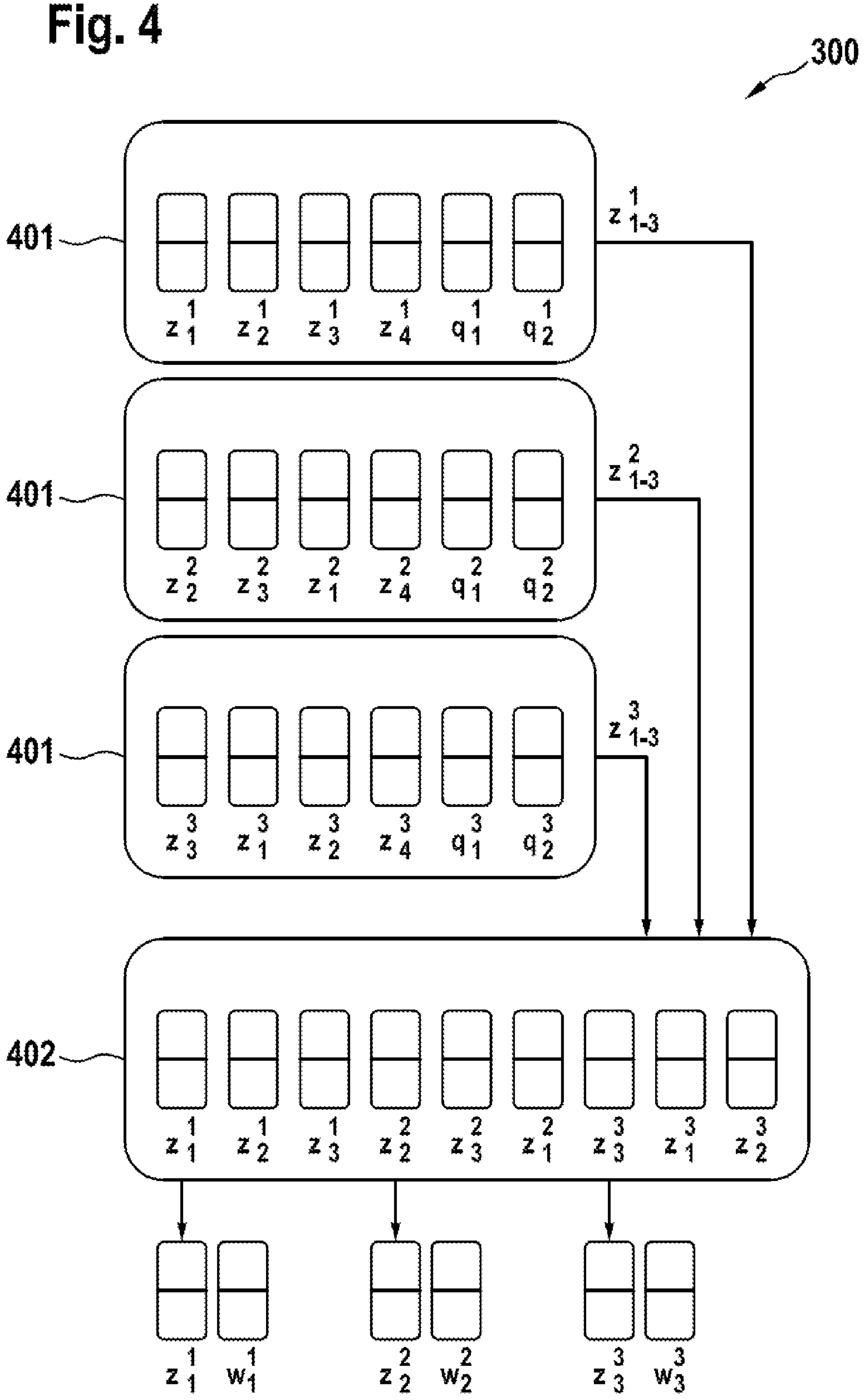
FIG. 4 shows a model for co-predicting trajectories for multiple agents.

FIG. 4 shows an ML model 400 for co-predicting trajectories for multiple agents.

The ML model 400 can be considered as an extension of the ML model 300. Specifically, it has a single-agent transformation network 401 for each agent for which a trajectory is to be predicted (here, K=3). Each single-agent transformation network 401 corresponds to the transformation network 305 for the respective agent with corresponding input of star graphs 306 processed by GATs 304 for the respective agent. Here, the outputs of the transformation networks 401 are also used for the other agents (not just $$z_i^i$$

as in the example of FIG. 2). That is to say, the transformation networks 401 overall provide the (processed) positional embeddings corresponding to each of the K agents, for each of the K reference frames, i.e., $K^2$ feature vectors $$\left\{\{z_j^k\}_{j=1}^K\right\}_{k=1}^K.$$

This combination of features contains mutual local information about each of the K agents (at the cost of a square number of features).

The representation, in a local reference frame of an agent, of trajectories of the agents and the vicinity of the agent means representation in a local coordinate system of the agent, i.e., relative to the agent, for example with the current location of the agent in the center.

These features are supplied (in the form of a matrix) to a common multi-head-attention transformation network 402 that combines the features from all local reference frames into an implicit global reference frame. In the output, as in the ML model of FIG. 2, the associated (updated, i.e., processed) feature $$z_i^i$$

for each agent is then taken from the output matrix of the multi-head-attention transformation network 402, and a respective trajectory is predicted by means of the decoder (not shown in FIG. 4 but analogous to that in FIG. 3).

The same loss as with the ML model 200 can be used for training the ML model 300 (using ground-truth trajectories for all K agents here).

When combining multiple local contexts into an implicit global context, the embeddings in different reference frames corresponding to the same vehicle should only affect one another. This can be accomplished by restricting self-attention by means of a $K^2 \times K^2$ attention matrix. It ensures that only features $$\{z_i^k\}_{k=1}^K$$

for the i-th agent in different reference frames are considered in each row of the input matrix of the multi-head-attention transformation network 402.

An example of an attention matrix for three vehicles is given below.

Attention Matrix

| | | | | | | | | |
|---|---|---|---|---|---|---|---|---|
| 1 | 0 | 0 | 0 | 0 | 1 | 0 | 1 | 0 |
| 0 | 2 | 0 | 2 | 0 | 0 | 0 | 0 | 2 |
| 0 | 0 | 3 | 0 | 3 | 0 | 3 | 0 | 0 |
| 1 | 0 | 0 | 0 | 0 | 1 | 0 | 1 | 0 |
| 0 | 2 | 0 | 2 | 0 | 0 | 0 | 0 | 2 |
| 0 | 0 | 3 | 0 | 3 | 0 | 3 | 0 | 0 |
| 1 | 0 | 0 | 0 | 0 | 1 | 0 | 1 | 0 |
| 0 | 2 | 0 | 2 | 0 | 0 | 0 | 0 | 2 |
| 0 | 0 | 3 | 0 | 3 | 0 | 3 | 0 | 0 |

Non-zero entries denote an attention to a feature vector of a vehicle in a row, whereas a zero indicates that no attention is present. Each 3×3 matrix in a block row can be obtained by shifting the left neighbor one place to the left.

The common ML model 400 with masking allows for explicitly combining multiple local interaction models and integrating them into an implicit global interaction model. Each local single-agent model uses direct map representations that affect local interaction.

Figure 5:
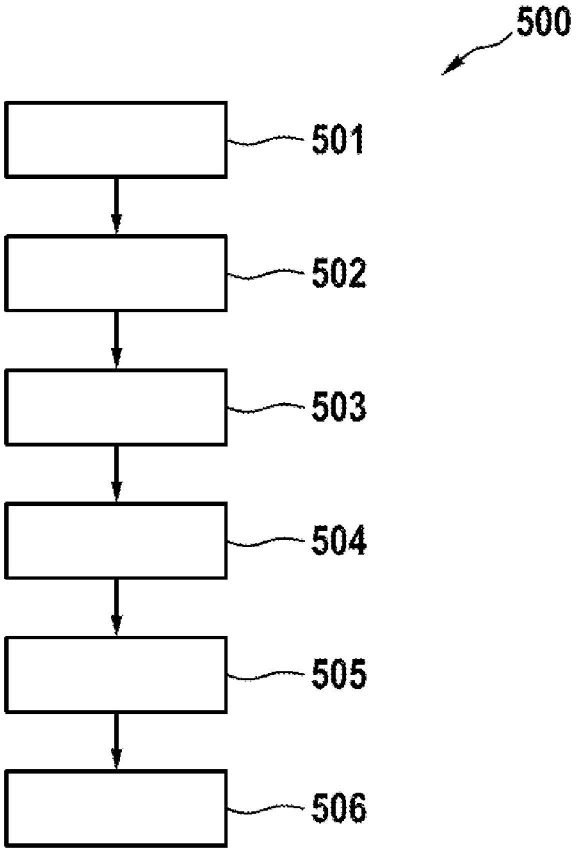
FIG. 5 shows a flowchart depicting a method for determining agent trajectories in a multi-agent scenario, according to one embodiment.

In summary, according to various embodiments, a method as shown in FIG. 5 is provided.

FIG. 5 shows a flowchart 500 depicting a method for determining agent trajectories in a multi-agent scenario, according to one embodiment.

At 501, for each agent, previous trajectories of the agents and a vicinity of the agent are captured in a local reference frame of the agent. The local reference frame is, for example, centered on a current position of the agent. This means that the previous trajectories of the agents are captured relative to a current position of the agent. This is done for each agent so that the trajectories of all agents (including those of the agent itself) are captured relative to the agent.

At 502, for each agent, the previous trajectories of the agents, captured in the local reference frame of the agent, are encoded into trajectory feature vectors and the vicinity of the agent, captured in the local reference frame of the agent, is encoded into vicinity feature vectors by means of an encoder neural network.

At 503, for each agent, the trajectory feature vectors, depending on one another and depending on the vicinity feature vectors, are processed by means of an attention-based neural network into local-context feature vectors.

At 504, the local-context feature vectors for all agents are processed into a global-context feature vector for each agent by means of a common attention-based neural transformation network.

At 505, control actions are determined for each agent from the global-context feature vector for the agent by means of an action-prediction neural network.

At 506, a future trajectory is determined for each agent from the determined control actions by means of a kinematic model.

The method of FIG. 5 may be performed by one or more computers comprising one or more data processing units. The term "data processing unit" may be understood to mean any type of entity that enables the processing of data or signals. For example, the data or signals may be processed according to at least one (i.e., one or more than one) specific function performed by the data processing unit. A data processing unit may comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate assembly (FPGA), or any combination thereof. Any other way of implementing the respective functions described in more detail herein may also be understood as a data processing unit or logic circuitry. One or more of the method steps described in detail herein may be performed (e.g., implemented) by a data processing unit by one or more particular functions executed by the data processing unit.

For example, the controller 102 may perform the method for predicting trajectories of the other vehicles 108. It then considers these predictions when determining or selecting a trajectory for the own vehicle.

Various embodiments may receive and use sensor signals from various sensors, such as video, radar, LiDAR, ultrasound, movement, acceleration, heat map, etc., for example in order to acquire sensor data for detecting objects (i.e., other agents) and recording their previous trajectories and as input for the ML model for predicting the behavior.

Embodiments can be used to train a machine learning system and to control an agent, e.g., a physical system, such as a robot or a vehicle.

The controlled agent may be a robotic device, i.e., a control signal for a robotic device may be generated. The term "robotic device" may be understood to mean any physical system (with a mechanical part whose movement is controlled), such as a computer-controlled machine, a vehicle, a household appliance, an electric tool, a manufacturing machine, a personal assistant, or an access control system. A control rule for the physical system is learned, and the physical system is then controlled accordingly.

However, the described approaches may be applied to any type of agent (e.g., also to an agent that is only simulated and does not exist physically). For example, training data (in the form of exemplary scenarios) for other ML models may also be generated therewith.

Although specific embodiments have been illustrated and described herein, the person skilled in the art recognizes that the specific embodiments shown and described may be substituted for a variety of alternative and/or equivalent implementations without departing from the scope of protection of the disclosure. This application is intended to cover any adaptations or variations of the specific embodiments discussed herein. This disclosure is therefore intended to be limited only by the claims and equivalents thereof.

What is claimed is:

1. A method for operating an autonomous vehicle in a multi-agent scenario, the method comprising:

capturing, for each respective agent of a plurality of agents, previous trajectories of the agents and a vicinity of the agent in a local reference frame of the agent, the vicinity of the agent including other agents of the plurality of agents, the plurality of agents at least including the autonomous vehicle and other vehicles;

encoding, using an encoder neural network, for each respective agent, (i) the previous trajectories of the agents, captured in the local reference frame of the respective agent, into trajectory feature vectors and (ii) the vicinity of the agent, captured in the local reference frame of the respective agent, into vicinity feature vectors;

determining, for each respective agent, local-context feature vectors based on the trajectory feature vectors and the vicinity feature vectors in the local reference frame of the respective agent using an attention-based neural network;

determining, for each respective agent, a global-context feature vector based on the local-context feature vectors for all agents using a common attention-based transformer neural network;

determining, for each respective agent, control actions from the global-context feature vector for the agent using an action-prediction neural network;

determining, for each respective agent, a future trajectory from the determined control actions using a kinematic model; and operating the autonomous vehicle to perform an operation based on the determined control actions for the autonomous vehicle.

2. The method according to claim 1, further comprising, for each agent:

capturing the vicinity as a set of vicinity elements, wherein each vicinity element is encoded into vicinity feature vectors; and forming, for each vicinity element, a star graph comprising, as a central node, a node with the trajectory feature vector of the agent, wherein the central node is surrounded by nodes with the vicinity feature vectors of the vicinity element, wherein the attention-based neural network comprises one or more graph-attention networks to which the star graphs are supplied.

3. The method according to claim 2, wherein the one or more graph-attention networks generate vicinity-element feature vectors, and the attention-based neural network comprises an attention-based transformer neural network that processes trajectory feature vectors, depending on one another and depending on the vicinity-element feature vectors, into the local-context feature vectors.

4. The method according to claim 1, wherein the common attention-based transformer neural network is a multi-head-attention transformation network.

5. The method according to claim 1, further comprising:

acquiring training data comprising training data elements, wherein each training data element has information about the vicinity, previous trajectories of the agents, and target trajectories for a respective training scenario; and training the encoder network, the attention-based neural network, the common attention-based transformer neural network, and the action-prediction neural network using supervised learning and the training data.

6. The method according to claim 1, wherein a computer program comprises instructions that, when executed by a processor, cause the processor to perform the method.

7. The method according to claim 6, wherein the computer program is stored on a non-transitory computer-readable medium.

8. A controller configured to perform the method according to claim 1.

* * * * *